(12) United States Patent
Charles et al.

(10) Patent No.: US 9,409,169 B2
(45) Date of Patent: Aug. 9, 2016

(54) MICROFLUIDIC CARD CONNECTION DEVICE

(75) Inventors: Raymond Charles, Saint Jean de Moirans (FR); Patrick Pouteau, Meylan (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 25 days.

(21) Appl. No.: 14/110,603

(22) PCT Filed: Apr. 6, 2012

(86) PCT No.: PCT/FR2012/050765
§ 371 (c)(1),
(2), (4) Date: Oct. 8, 2013

(87) PCT Pub. No.: WO2012/136943
PCT Pub. Date: Oct. 11, 2012

(65) Prior Publication Data
US 2014/0037515 A1 Feb. 6, 2014

(30) Foreign Application Priority Data

Apr. 8, 2011 (FR) ..................................... 11 53072

(51) Int. Cl.
*B01L 3/00* (2006.01)
*B01L 9/00* (2006.01)
*G01N 21/01* (2006.01)

(52) U.S. Cl.
CPC ........... *B01L 3/502715* (2013.01); *B01L 9/527* (2013.01); *B01J 2219/0081* (2013.01); *B01J 2219/00813* (2013.01); *B01L 9/52* (2013.01); *B01L 2200/025* (2013.01); *B01L 2200/027* (2013.01); *B01L 2200/028* (2013.01); *B01L2200/04* (2013.01); *B01L 2200/0689* (2013.01); *B01L 2300/0816* (2013.01); *Y10T 29/49002* (2015.01)

(58) Field of Classification Search
CPC ................ B01L 2300/0816; B01J 2219/0081; B01J 2219/00813
See application file for complete search history.

(56) References Cited

U.S. PATENT DOCUMENTS 5,955,028 A 9/1999 Chow
7,513,535 B2 4/2009 Charles et al.
(Continued)

FOREIGN PATENT DOCUMENTS

CN 201004428 Y 1/2008
CN 101123319 A 2/2008
(Continued)

OTHER PUBLICATIONS

French Preliminary Search Report issued Jan. 26, 2012 in Patent Application No. FR 1153072 (with English translation).
(Continued)

*Primary Examiner* — Jennifer Wecker
(74) *Attorney, Agent, or Firm* — Oblon, McClelland, Maier & Neustadt, L.L.P.

(57) ABSTRACT

A device for interconnecting a card including at least one first fluid channel, emerging from a connection side parallel to a support side, the interconnection device including: a first surface configured to receive the support side of the card; a second surface parallel to the first surface, from which a second fluid channel emerges; and a mechanism to hold the card in place, configured to hold a connection side of the card pressed against the second surface of the device, such that first fluid channel is in fluid connection with the second fluid channel.

23 Claims, 8 Drawing Sheets

(56) References Cited

U.S. PATENT DOCUMENTS

| | | |
|---|---|---|
| 8,673,153 B2 | 3/2014 | Campagnolo et al. |
| 2002/0043805 A1 | 4/2002 | Charles et al. |
| 2003/0059349 A1 | 3/2003 | Howe |
| 2003/0091477 A1 | 5/2003 | Paul et al. |
| 2004/0051317 A1 | 3/2004 | Charles et al. |
| 2004/0096359 A1 | 5/2004 | Sarrut et al. |
| 2005/0035598 A1 | 2/2005 | Charles et al. |
| 2006/0024702 A1 | 2/2006 | Connolly et al. |
| 2007/0237687 A1 | 10/2007 | Sleeper |
| 2008/0299013 A1* | 12/2008 | Trieu et al. .................. 422/104 |
| 2009/0267167 A1 | 10/2009 | Pouteau et al. |
| 2009/0302190 A1 | 12/2009 | Trieu et al. |
| 2010/0132447 A1 | 6/2010 | Sleeper |
| 2010/0276005 A1 | 11/2010 | Allain et al. |

FOREIGN PATENT DOCUMENTS

| | | |
|---|---|---|
| DE | 10 2006 02251 | 8/2007 |
| DE | 102006022511 B3 * | 8/2007 |
| EP | 1 170 542 A1 | 1/2002 |
| EP | 2 153 892 | 2/2010 |
| JP | 2000-515630 | 11/2000 |
| JP | 2003-525101 | 8/2003 |
| JP | 2005-059157 | 3/2005 |
| JP | 2007-064742 | 3/2007 |
| JP | 2007-229242 | 9/2007 |
| JP | 2008-046140 | 2/2008 |
| JP | 2010-137143 | 6/2010 |
| WO | WO 0013795 | 3/2000 |
| WO | WO 02/070942 A1 | 9/2002 |
| WO | 2008 049447 | 5/2008 |

OTHER PUBLICATIONS

U.S. Appl. No. 14/773,215, filed Sep. 4, 2015, Pouteau, et al.

International Search Report Issued Jul. 20, 2012 in PCT/FR12/050765 Filed Apr. 6, 2012.

Notice of Reasons for Rejection issued in corresponding Japanese Patent Application No. 2014-503203 mailed Mar. 7, 2016.

* cited by examiner

MICROFLUIDIC CARD CONNECTION DEVICE

TECHNICAL FIELD

The invention relates to a device for watertight or airtight connection and disconnection of a microfluidic card, with one or more instruments, such as for example a measuring device, a heating element, a mechanical actuator, a pump, etc.

The invention relates to fields including those of medical research, biology and pharmaceuticals.

The invention also relates to a method for connecting and disconnecting a microfluidic card in the said connection device, without tools and without particular technical knowledge.

STATE OF THE PRIOR ART

The use of in vitro diagnostic devices generally requires that a card, including a fluid circuit, is connected to an instrumented support. The term "card" is understood to mean a support made from a rigid material, which may include a fluid circuit. The card may, for example, include complex means, such as a biochip, a valve, a reaction chamber, etc. The problem of connecting the card to an instrumented support is very often overlooked. As a consequence, the techniques generally used are delicate and burdensome to implement, as is shown by the examples below.

According to a first technique for connecting and disconnecting a card to or from an instrument, the card is pre-positioned on a connection support which is connected to one, or possibly several, instruments.

The microfluidic card is held in place by flanges which hold the card against the support.

Watertightness or airtightness between the card's fluid inlet and outlets, and the support's inlets and outlets, is obtained by compressing seals positioned between the microfluidic card and the support. This type of connection requires several moving means, such as for example flanges, flange-clamping elements, seals, screwdrivers, etc. And these moving means may go astray when they are used and, in addition, they require delicate handling when positioning and/or using them. These handling operations may rapidly become burdensome when they are undertaken frequently.

According to a second technique, the card includes a connector intended to be connected to a base of the support, or vice versa. Producing such a card is constrictive and costly. In both cases, the steps of production, connection and disconnection of a microfluidic card to an instrumented support are lengthy and delicate.

The present invention resolves the above problems by disclosing a fast and simplified connection and disconnection device, which may be used in a large number of different environments.

DESCRIPTION OF THE INVENTION

The invention relates to a device for interconnecting a card, where the card includes at least one first fluid channel, emerging from a connection side, where this side is parallel to a support side, and where the said interconnection device includes:
  a first surface, intended to receive the card's support side,
  a second surface parallel to the first surface, from which a second fluid channel emerges,
  means to hold the card in place, intended to hold the card's connection side pressed against the second surface of the device, such that the first fluid channel is in fluid connection with the second fluid channel.

A means defining an axis of rotation is defined, such that a card is able to tip or pivot around this axis and then be pressed against the first surface.

An interconnection device according to the invention enables a card to be connected to, or disconnected from, the said device.

The holding means are able to hold the card's support side against the device's first surface, such that the card's connection side is held pressed against the second surface of the device.

The axis of rotation may be defined by a ridge or a portion of, or on, the first surface of the device.

The rotation axis is preferentially parallel to the second surface and to the first surface of the device.

A rotary motion of a card is accomplished in a plane perpendicular to the axis of rotation, to bring the card such that it presses against the first surface and also, preferably simultaneously, against the second surface.

When the openings of the channels formed in the card and the device, which are intended to be connected, include seals, such a rotary motion enables a shearing stress on the seals to be prevented when the card is pressed against the second surface of the device.

When the card is pressed against the first surface it is also pressed against the second surface: the card is then said to be connected to the device or, alternatively, it is said that there is a fluid connection. The term "fluid connection" is understood to mean a contact between two channels, allowing a fluid, whether gaseous or liquid, to pass from a channel of the device to a channel of the card, and possibly from a channel of the card to a channel of the device, where the connection is generally watertight or airtight.

Through a lever effect the connection surface of the card is pressed against the second surface of the device, which allows a fluid connection between a channel of the card, emerging from the connection side, and a channel emerging from the support side of the device.

The holding means may be removable and/or deformable and/or reversible, in order to allow the card to be connected to, or disconnected from, the device, without tools and as desired.

The holding means may exert on the card, positioned on the said first surface of the device, a force having a component perpendicular to this first surface. The holding means may possibly exert on the card, positioned on the said first surface of the said device, at least one force having a component perpendicular to this first surface.

A combination of such forces allows the card to be pressed against the device in optimum fashion.

A device according to the invention may include at least one fluid channel emerging from the second surface of the device. At least one tube may be positioned in such a channel.

A means of ensuring watertightness or airtightness, for example a seal, may be positioned at the opening of such a channel in order to allow a watertight or airtight fluid connection with a channel of the card, when the latter is held against the device. A seal may also be positioned in the opening of a channel of the card. A rotary motion around an axis, as explained above, enables all friction or sliding in the seals to be prevented.

The card is said to be connected when one of its channels is in fluid connection with a channel of the device. When the connection is made the seal or seals are preferably compressed, or slightly compressed, between the card's connection side and the second surface, causing watertightness or airtightness between the said channels. This compression is accomplished in a direction perpendicular to the second surface (or to the card's connection surface).

When the card is connected to the device, the card's connection side is generally pressed against the second surface of the device. The connection side and the second surface may be in direct contact, or alternatively may be separated by the thickness of a seal, or of 2 seals, located at the position of the opening of the first fluid channel, formed in the card and/or of the opening of the second fluid channel, formed in the device.

A device according to the invention may be monoblock, where its different portions are attached one to another. As a variant, it may include at least two easy-disassembly portions, and/or at least two portions the positioning of which in space, or the relative position of which, may be varied using adjustment means.

The interconnection device may consist of means to form at least one third surface, or bottom surface, roughly opposite and roughly parallel to the second surface, and separated from the latter by a distance greater than the distance separating the first surface and the second surface.

In addition to the connection of fluid channels, a device according to the invention may allow an electrical and/or optical and/or thermal connection between the card and the device. For example, when the fluid connection between a channel of the card and the device is made an electrical connection, respectively optical or thermal, may be obtained between electrical means, respectively optical or thermal, positioned on the card, for example on the card's connection side, and on the device, for example on its second surface.

In a preferred embodiment, the second surface is positioned parallel to the first surface, but the said surfaces preferably do not overhang one another.

The second surface may overhang a third surface, or bottom surface, parallel to the first surface, positioned underneath and at a distance from the latter. The second and third surfaces may then delimit an area for insertion of an end of the card to be connected.

An interconnection device according to the invention may be delimited by one or more walls, perpendicular to the first and to the second surface of the said device. For example, a first wall, called the rear wall, may be positioned in contact with an edge of the first surface, preferably the edge furthest from the second surface. A second wall, called the front wall, may be positioned in contact with an edge of the second surface, preferably the edge furthest from the first surface. The rear wall and the front wall are preferably then facing one another and separated by a distance D. The bottom surface may have its furthest edge from the front wall, of a distance d, of between D/2 and D/20.

The closest ends of the first surface and of the second surface are preferably separated by a distance equal to or greater than 1.1 times or 1.2 times the thickness of a card which may be connected to the device. This enables the card to be introduced easily into the insertion area.

A device according to the invention may include means forming at least one pin, which can move in a direction roughly perpendicular to the first surface and/or to the second surface. The pin may then apply a pressure, by a sliding motion, on to a card connected to the device. The said pin or pins are preferably perpendicular to, and facing, the first surface.

The invention also relates to a method for connecting and disconnecting a card with a device according to the invention. The card to be connected has at least one first fluid channel emerging from a connection side, for example an upper surface, parallel to a supporting surface, for example a lower surface. The first fluid channel has at least one opening on the card's said connection side. When the card is connected to the device the support side is brought towards the first surface of the device. Through a lever effect, the card's connection side is then pressed against the second surface of the device, such that at least one opening of a first fluid channel, formed in the card, and at least one opening of a second fluid channel, formed in the device, are in fluid connection.

With a device according to the invention, or with a method according to the invention, the card's connection side is pressed against the second surface of the device, or the first fluid channel comes into fluid connection with the second fluid channel, at the same time as the supporting surface of the card comes into contact with the first surface of the device.

The fact that the card is pressed against, or pressed towards, a surface, or against a surface, indicates that the card is held pinned to the said surface, but does not suppose necessarily a direct contact between the card and the said surface.

The connection side of the card and the second surface of the device may be in contact, or again may be separated by at least one seal causing watertightness or airtightness between the two fluid channels.

The card is preferably connected to the device by a method comprising two motions which may follow one another in succession.

With a sliding motion, the card is inserted into the device, such that the upper side of the card is roughly opposite the second surface, and the support side of the card is in contact with an axis of rotation, which is preferably parallel to the first surface of the device, and roughly opposite the first and/or the bottom surface of the device.

The card pivots around the axis of rotation which is, in addition, preferably, perpendicular to a lengthways axis of the said device, defined below.

The pivoting motion continues until the card is connected to the device.

In a preferred manner, the pivoting axis may be a ridge formed by the intersection of the first surface with an inclined surface, where the latter connects the first surface to the bottom surface.

In a preferred manner, the pivoting axis is closer to the axis of a second channel, formed in the device, than to the rear edge of the first surface. Through the lever effect mentioned above, this enables a more substantial pressing force of the card to be applied against the second surface when the holding means act on the card such that it is held against the first surface of the device. The term "rear edge of the surface" is understood to mean the edge of this surface furthest from the front wall.

The method of disconnecting the card may be accomplished by reproducing the previous steps in reverse order.

With such a device, connection and/or disconnection of the card to or from the interconnection device according to the invention may be accomplished by an operator, preferably using one hand.

BRIEF DESCRIPTION OF THE ILLUSTRATIONS

A device according to the invention is represented in FIGS. 2 and 3, where a card is in connection position in FIG. 3.

FIGS. 12A to 14B illustrate the steps of a method for connecting a microfluidic card in a device according to the invention.

Identical, similar or equivalent portions of the various figures have the same numerical references, to make it easier to go from one figure to another. The various portions represented in the figures are not necessarily represented at a uniform scale, in order to make the figures more readable.

DETAILED DESCRIPTION OF PARTICULAR EMBODIMENTS

Figure 2:
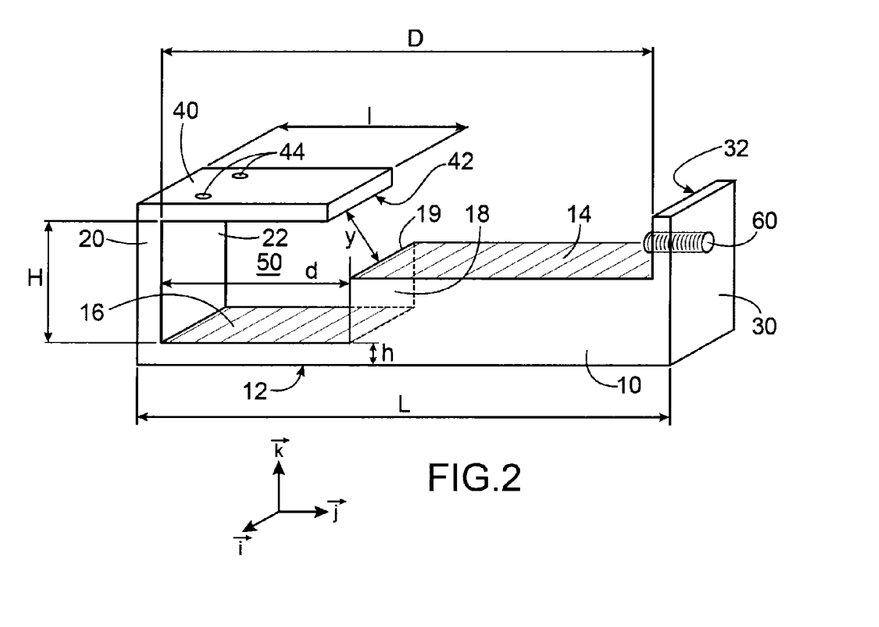
Figure 3:
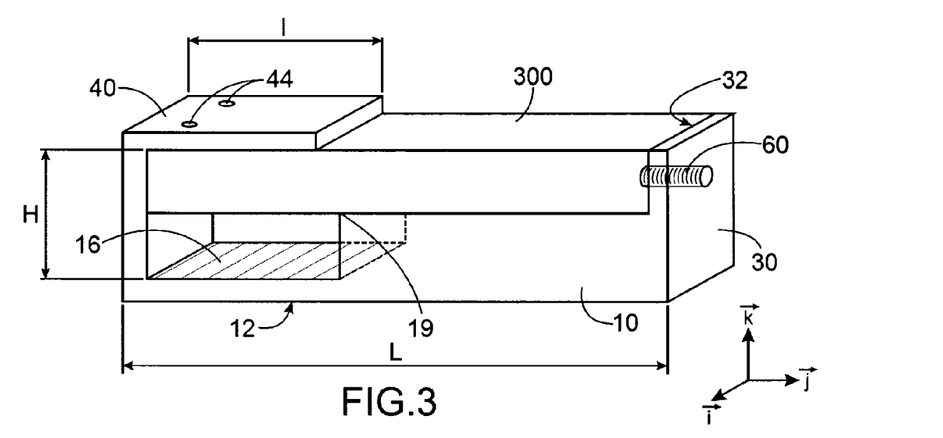
Figure 4:
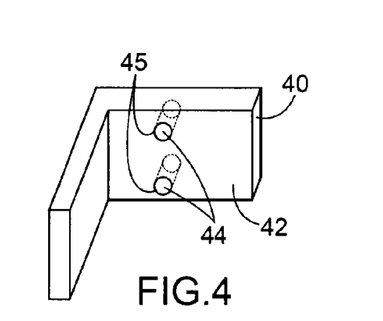
FIGS. 4 and 5A are perspective views of a portion of a device represented in FIGS. 2 and 3.

A first example embodiment of a device for connecting a card is represented in FIGS. 2-4.

Figure 1:
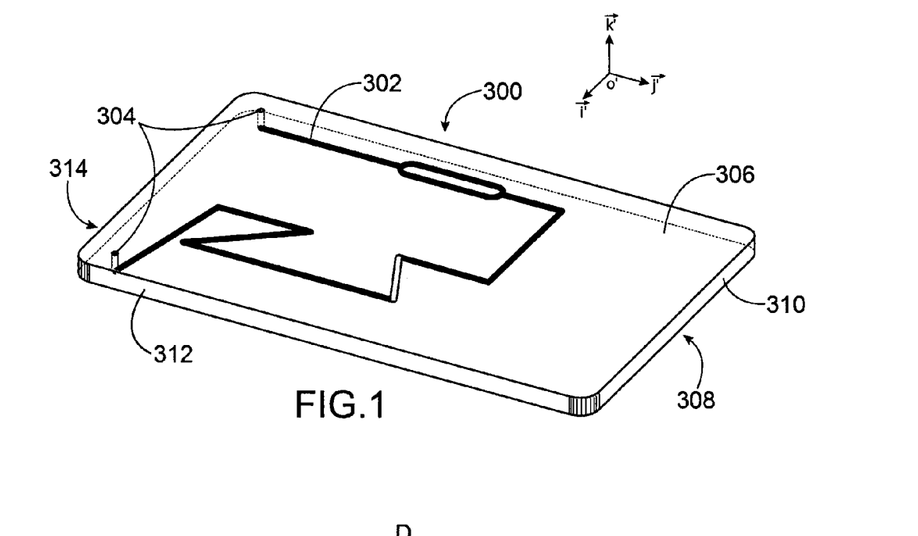
FIG. 1 represents an example of a microfluidic card which can be connected to and disconnected from a device according to the invention.

A card 300 (or fluidic card or microfluidic card or consumable) which may be connected to such a device is represented in FIG. 1. Card 300 includes at least one fluid (or microfluidic) channel 302 at its surface, and/or within it.

The card is a support made from a rigid material, preferably made of a single piece, which may include a fluid circuit. The card may, for example, include complex means, such as a biochip, and/or a valve, and/or a reaction chamber, etc.

The plate is detachable, intended to be connected to the connection device, such that the fluid circuit of the card is connected to the fluid circuit of the device.

The thickness of the card is defined along axis $\vec{k}'$ of an orthogonal reference point (O', i', j', k'), where its length is along axis $\vec{j}'$ and its width is along axis $\vec{i}'$.

The card preferably has dimensions similar to the dimensions of a credit card, and is sufficiently thick to contain at least one fluid channel, and possibly a fluid network (including several fluid channels).

The length and width of the card may therefore be between respectively several decimeters and several centimeters, for example between 1 cm and 10 cm or 20 cm, and its thickness may be between several centimeters and several millimeters, for example between, firstly, 1 mm or 5 mm and, secondly, 1 cm or 2 cm.

At least one fluid channel 302 is connected to at least one aperture or opening 304 emerging in a side 306 of the card, which will arbitrarily be called the connection side, a surface parallel to another side 308, which is arbitrarily called the support side.

Aperture or apertures 304 are located on the portion of connection side 306, closest to a side 314, located in a plane parallel to plane i'k' in FIG. 1. This side 314 may be called the front side; it is parallel to another side 310, called the rear side of the card.

A film, for example a plastic film, which is preferably biocompatible, may cover at least one opening 304 of a fluid channel 302 of card 300, an opening located in connection side 306. This film enables one or more openings 304 to be protected, in order to limit the intrusion of material into channel or channels 304, before connecting the card to a device according to the invention. It is then possible to use card 300 in various environments, without special cleanliness conditions.

In one embodiment, a connection device includes, as illustrated in FIG. 2, a base or baseplate 10, which itself includes a lower surface 12, or supporting surface of the entire device, and an upper surface or first surface 14, on to which a microfluidic card 300 may be pressed when the device is used: for this reason this surface 14 shall be called, in the remainder of the text, the supporting surface of card 300. In an orthogonal reference point (O, i, j, k), represented in FIG. 2, surfaces 12 and 14 may be roughly parallel with one another and with plane [O; $\vec{i}$; $\vec{j}$].

Along axis $\vec{j}$, the device is delimited at its ends by two walls 20 and 30 (called respectively the front and rear walls) positioned roughly perpendicularly to each of surfaces 12 and 14. Walls 20 and 30 may be roughly rectangular. Surface 22 of front wall 20, facing the interior of the device, may be called front stop 22. Surface 32 of the rear wall, which is adjacent to first surface 14, may be called the rear stop.

The length of the device in axis $\vec{j}$ will be designated L, and the distance, along the same axis, between front stop 22 and rear stop 32 will be designated D. Surface 14, the supporting surface of a microfluidic card, has an extension, along axis j, of less than length D. The values of D and of L are generally centimetric; they may be between 1 cm and 20 cm, and are more frequently between 3 cm and 10 cm.

In the embodiment shown in FIG. 2, base has the profile of a staircase step in plane [O; $\vec{j}$; $\vec{k}$]. The staircase step is defined, firstly, by first surface 14, and, secondly, by a second surface 16, called the bottom surface, which is itself roughly rectangular and parallel to each of surfaces 12 and 14. First surface 14 and bottom surface 16 are connected by a third surface 18, called the inclined surface, which in this example is roughly parallel to plane [O; $\vec{i}$; $\vec{k}$] and roughly perpendicular to each of surfaces 14 and 16. It is explained below that other alignments of surface 18 are possible.

The bottom of wall 20 is located against the front end of bottom surface 16. Front stop 22 is facing inclined surface 18.

Inclined surface 18 and front stop 22 are separated by a distance d, preferably between one half and one twentieth of distance D.

An upper wall or upper side plate 40, which is roughly parallel to supporting surface 12, to first surface 14 and to bottom surface 16, is connected to the upper portion of front stop 22.

The width of wall 40 is also centimetric, along axis $\vec{i}$, for example close to or identical to the width of front wall 20 and/or rear wall 30, and to the width of base 10 along this same axis. Upper wall 40 extends, along axis $\vec{j}$, over a centimetric length l, of for example between 1 and 20 cm, and preferably between 3 cm and 10 cm. Length l may be roughly equal to d, or slightly less or slightly greater than this.

A surface 42 of wall 40 is positioned opposite bottom surface 16. It will be called the second surface.

Upper wall 40 preferably does not overhang first surface 14. The ends closest to second surface 42 and first surface 14 are separated by a distance y, preferably equal to or greater than 1.1 or 1.2 times the thickness of the microfluidic card, measured along axis k when the card is positioned on first surface 14. This configuration facilitates an introduction of the microfluidic card slantwise, between second surface 42 and first surface 14.

As can be seen in FIG. 2, but also in FIGS. 3-6, upper wall 40 includes or contains, or is traversed by, at least one channel 44 having at least one of its apertures or openings 45 present on second surface 42.

One or more second ends of channels 44 may emerge on one or more surfaces of the device and be connected, for example, using tubes, to one of the fluid treatment or analysis instruments not represented in the figures. At least one of the channels may traverse wall 40 along axis $\vec{k}$, for example illustrated in FIGS. 3-5B.

Figure 5A:
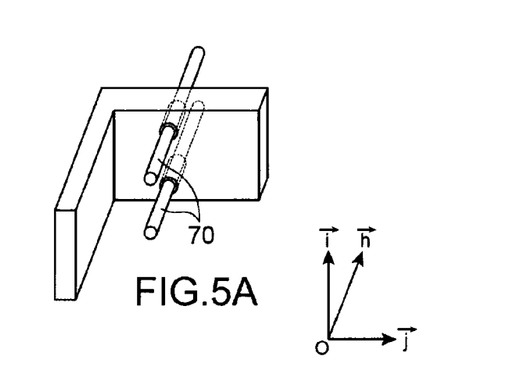
Figure 5B:
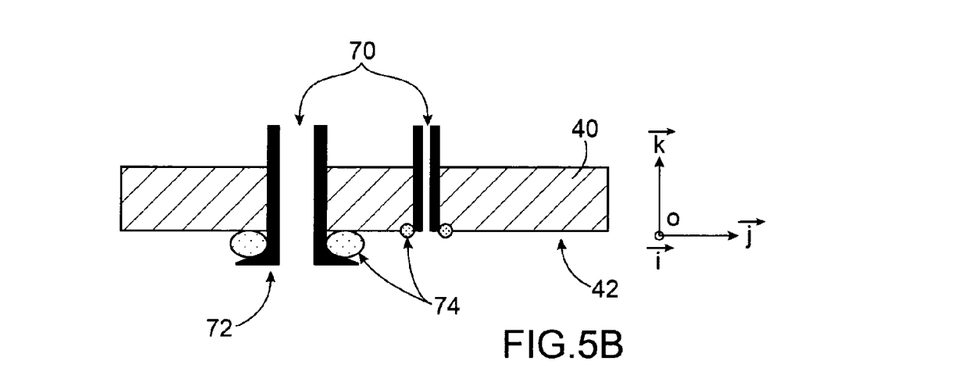
FIG. 5B is a transverse section of FIG. 5A.
Figure 6:
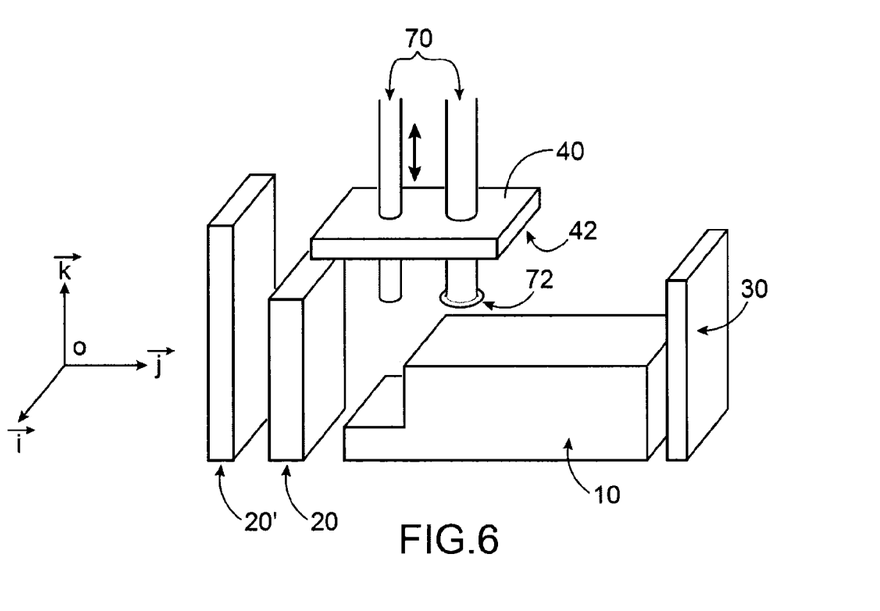
FIG. 6 is a three-dimensional view of another example of a device composed of detachable and interchangeable surfaces, In FIG. 7 a portion of an example device is represented with a perspective view.

As represented in FIGS. 5A, 5B, 6, the fluids may be conveyed in tubes 70 positioned in channels 44 to prevent all contact between the fluids and the walls of the channels.

The intersection between inclined surface 18 and first surface 14 forms a ridge 19 against which a card 300 may be positioned, where the latter may then be pivoted whilst being held against this ridge 19, in order that its support side 308 moves against, or close to, first surface 14, and in order that, preferably simultaneously, its connection side 306 moves against, or close to, second surface 42 of the device. In this manner a fluid connection is made. For this reason, ridge 19, which in this case forms part of first surface 14, or is positioned on this first surface 14, may also be called an axis of rotation. The positioning in which card 300 is pressing on ridge 19, followed by its rotation around this axis of rotation, are illustrated in FIG. 12A-13B.

Figure 14A:
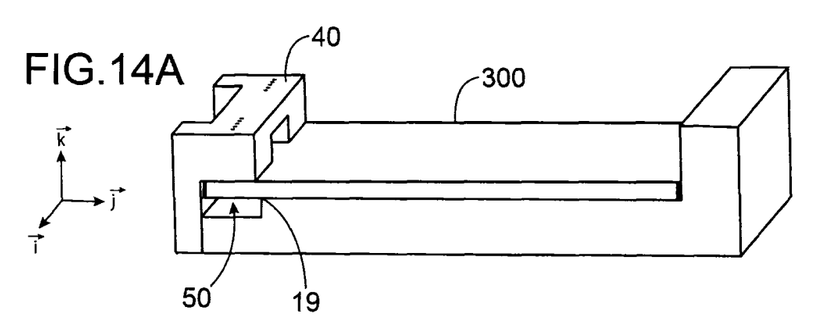
Figure 14B:
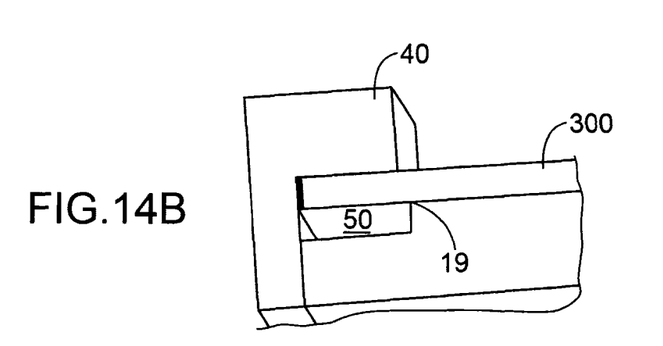

As may be seen in FIGS. 3, 14A, 14B a card 300 is connected to the device when its support side 308 is in contact with first surface 14 of base 10 and at least one fluid channel 302 of the card, present on connection side 306 of the said card, is in fluid connection with a fluid channel 44 emerging from second surface 42 of upper wall 40. Second surface 42 is then a support surface for connection side 306 of card 300 when the latter is connected to the device.

Holding means 60 (not represented in FIGS. 12A, 13A, 14A, but visible in FIGS. 2 and 3), which exert a force on card 300 when it is connected to the device, then hold it pressed against first surface of the device, which, through a lever effect, enables the card to be pressed against second surface 42 of the device.

Holding means 60 preferably exert:
a force perpendicular to first surface 14 (i.e. in the direction of axis $\vec{k}$) aligned towards first surface 14, against which the card is then held,
and, possibly, a force parallel to first surface 14 (i.e. in the direction of axis j) towards front stop 22, against which the card is then also held.

Card 300 may in this manner be pinned against first surface 14 and, possibly, against front stop 22, by means of holding means 60.

It is also possible for holding means 60 to exert only a force perpendicular to first surface 14, aligned towards the latter.

The force applied by holding means 60 is reversible, to allow card 300 to be positioned on first surface 14, and then to allow this same card to be removed.

It is understood that the closer axis 19 is to the axis of channel 44 emerging from second surface 42, the greater is the lever effect obtained by imparting action to the rear portion of card 300, i.e. the portion of the card located close to rear wall 30 of the device. Thus, generally, in order to maximise the lever effect, axis 19, against which card 300 is pressed before it then pivots, is positioned relatively far from rear wall 30 of the device, and relatively close to at least one opening of a channel 44 emerging from second surface 42 of the device. For example, axis 19 is equal to or less than half the distance from the opening of channel 44 (or from an axis of this channel pointing in direction k) than from rear wall 30. This enables a greater pressing force to be applied, on to card 300, against second surface 42. A watertight or airtight fluid connection is then obtained. This is notably case when, as explained below, at least one seal 74 is positioned in at least one opening of at least one channel 44, 302 (FIG. 5B).

Surfaces 16 (bottom surface), 18 (inclined surface), 22 (front stop) and 42 (second surface) define a housing volume, or insertion area, 50 of a portion of a microfluidic card, as will be explained in detail below. Second surface 42 of wall 40 is facing bottom surface 16 and separated from the latter by a centimetric distance H, which may be between several millimeters and several centimeters, for example between 1 mm or 5 mm and 5 cm or 10 cm.

Base 10, front wall 20, rear wall 30 and upper wall 40 may form a single part made from a material of a rigid type, such as for example glass, metal or a plastic.

According to a particular embodiment, rear wall 40 is traversed along axis $\vec{j}$ by at least one threaded hole in which holding means 60 enabling the card to be held pressed against first surface 14 are inserted.

Holding means 60 include, in this example, a spring thrust ball bearing of cylindrical shape including a screw pitch on its outer surface, a ball on one end and a screw slot at the opposite end. The screw slot enables the stop to be positioned in the hole in order that the ball may extend beyond rear stop 32 in order that the distance between front stop 22 and the end of the ball closest to this surface is less than, preferably slightly less than, the length of card 300. The ball has a sliding motion along the cylindrical axis of the stop in order that it is able to be partially or completely removed from rear wall 30, and by this means enable pressing side 308 of microfluidic card 300 to be positioned against first surface 14 of the device. The ball exerts a holding force, on card 300, to keep it pressed against first surface 14.

In order to exert a force, as explained above, along axis k and along axis j, the axis of the spring thrust bearing of cylindrical shape 60 is, preferably, positioned at a distance from first surface 14 of between $\epsilon$ and $\epsilon+r$, where:
$\epsilon$ is the thickness of card 300,
r is the radius of the ball.

Card 300 is in this manner pinned both against front stop 22 and against first surface 14, by means of holding means 60.

The sliding motion of the ball and the restoring force exerted by the spring on the ball are reversible, to enable the card to be connected to and disconnected from the device.

As may be understood, at least one opening 304 is put into fluid connection with at least one of openings 45, to enable material to flow, in the form of fluids, whether gaseous or liquid, between the connection device according to the invention and the microfluidic card connected to the device. In a particular embodiment, one or more openings 45 may be fitted with a seal 74 to provide or to improve watertightness or airtightness when the card is connected to the device. Several openings may emerge from second surface 42. Each opening 45 may be of a different section, or of a section similar or identical to the section of at least one of openings 304 present at the surface of a microfluidic card (FIG. 1).

The possibility of using tubes 70 in one or more of channels 44 has previously been mentioned. These tubes may be made of plastic and have an outer diameter of less than or equal to the inner section of channels 44, such that they may be inserted in them. One or more of these tubes 70 may be detachable or interchangeable. Thus, to eliminate all risk of contamination of the walls of the channels and/or of the walls of tubes 70 by a fluid, it is possible to replace tubes having conveyed material with clean or "blank" tubes, or tubes having conveyed the same material. Each tube 70 may have a section which broadens at one of its ends 72 such that it cannot become sunk in channels 44, as can be seen in FIG. 5 B. Seals 74, which are suitable for the shape of the tube, may be positioned, preferentially, in the openings of channels 44, so as to provide satisfactory watertightness or airtightness when a microfluidic card, preferably having a flat surface, is pressed against surface 42, as is also explained in document EP 1 170 542.

As a variant, tube or tubes 70 positioned in channel or channels 44 may have one end which extends beyond surface 42, as is also explained in document WO 02/070 942, FIG. 1. When surface 306 of card 300 is covered by a protective film, this tube may be used to pierce the latter when connection side 306 of card 300 is pressed against or directed towards surface 42 of upper wall 40.

FIG. 6, in which the same elements are found as in the previous figures, represents a variant of the previous devices, in which front wall 20, rear wall 30 and upper wall 40 are easy-disassembly or detachable. The walls and base 10 of the device may be chosen and modified to match card 300 which it is desired to connect. For example, a front wall 20' of height different from front wall 20, may be substituted for the latter to cause distance H to be varied, and by this means to allow cards 300 of different thicknesses to be connected. Base 10 may also be changed such that distance D may be modified for cards 300 of different lengths along axis $\vec{j}$. Upper wall 40 may be separated from front wall 20 and/or front wall 20 may be separated from base 10 to allow easier substitution of tubes 70 in channels 44 and to allow the channels to be cleaned.

Figure 7:
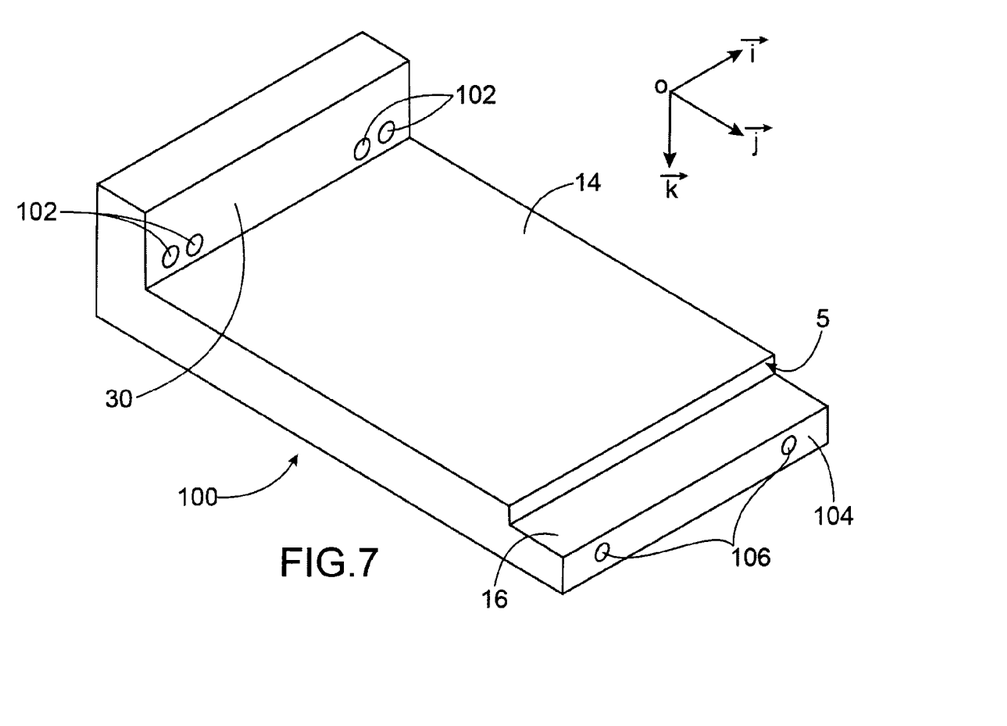
Figure 8A:
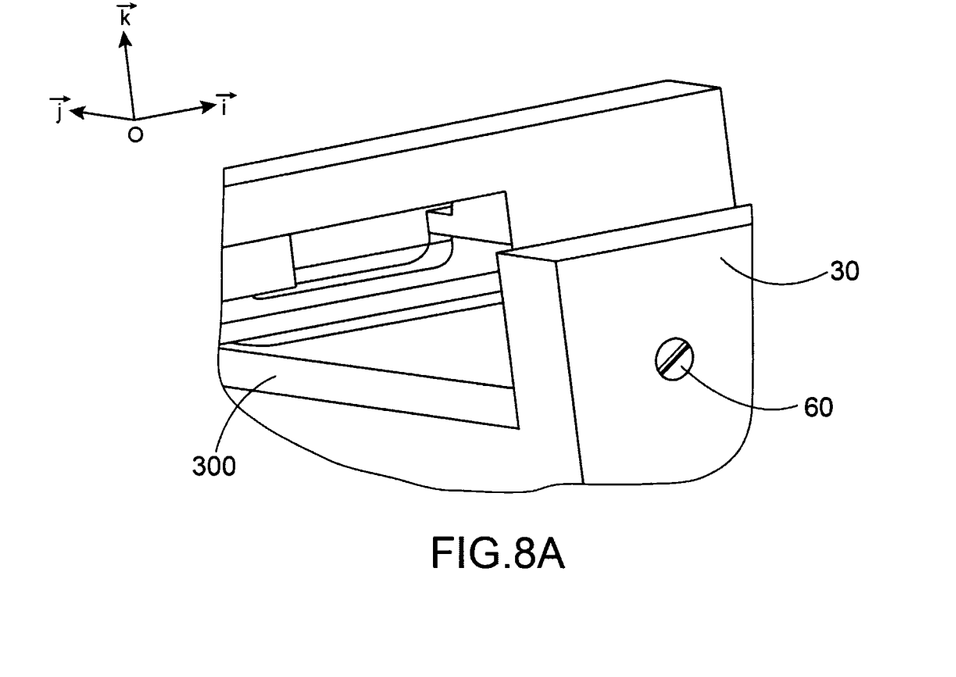
FIGS. 8A and 8B are representations of a device assembled with the portion represented in FIG. 7.
Figure 8B:
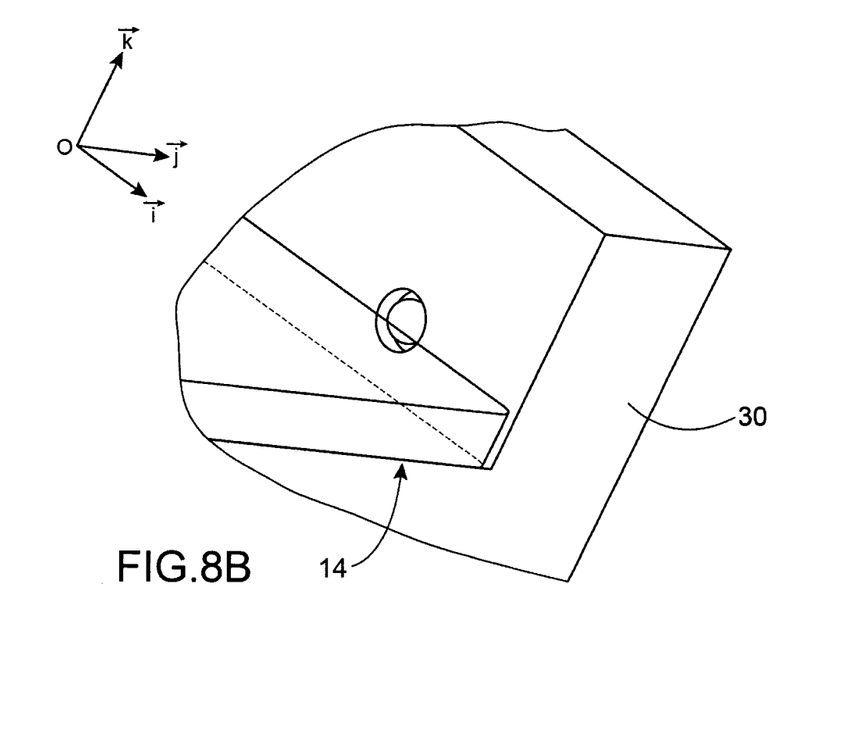

As another variant, base 10 and rear wall 30 form a monolithic part 100, manufactured for example by machining, as can be seen in FIG. 7. One or more threaded holes 102, in this case 4 such, traversing rear wall 30, allow spring thrust ball bearings 60 to be housed. The housing of this stop is represented in greater detail in FIGS. 8A and 8B. One or more threaded holes 106 (2 in the example of FIG. 7), may be made on front surface 104 of base 100 to enable a part 100, called the front part, to be attached.

Figure 9:
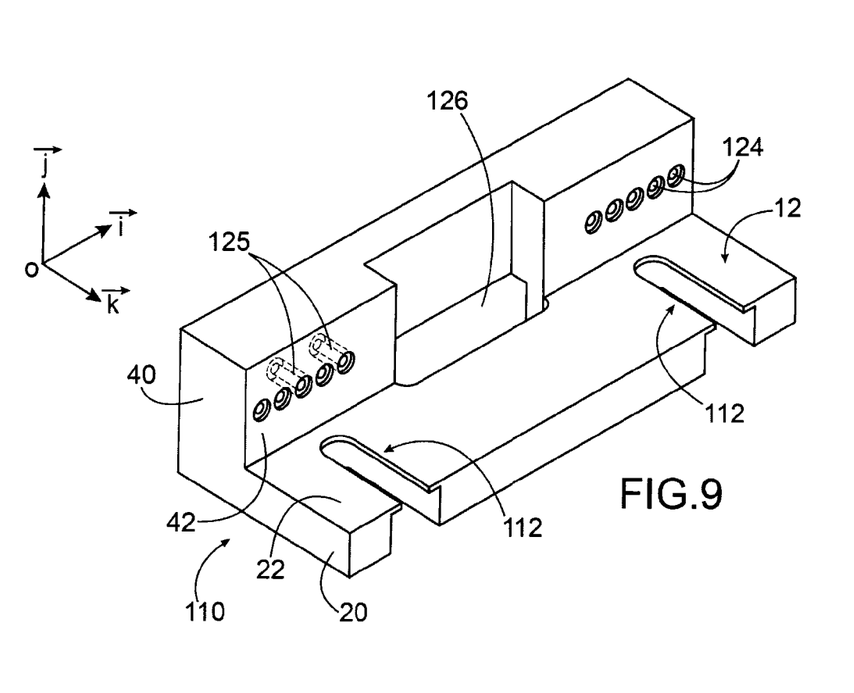
FIG. 9 represents another portion of the device represented in FIGS. 7 and 8A-B.
Figure 10:
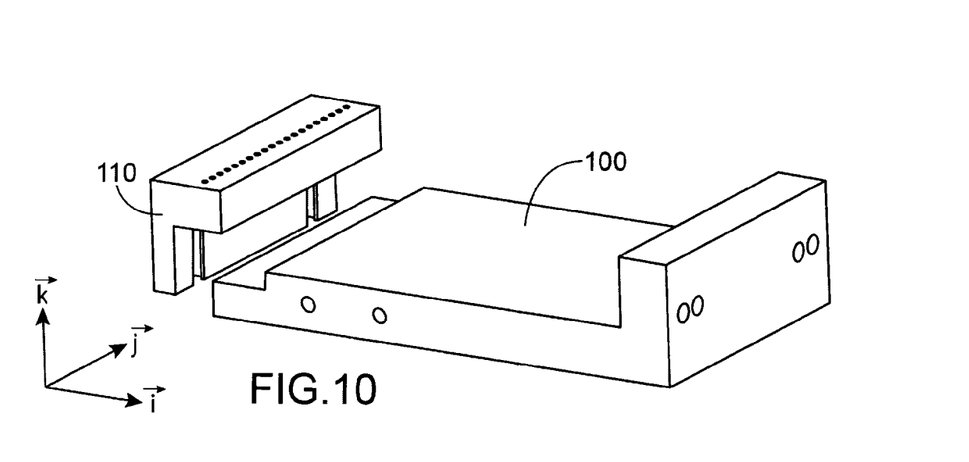
FIG. 10 illustrates an assembly of a device represented in FIGS. 7 to 9.

This part may be monolithic, manufactured from a single part by machining, and consisting of walls 20 and 40 (FIG. 9). Two trenches, or grooves, 112, which are parallel with one another, separate and perpendicular to wall 40, traverse wall 20 along axis $\vec{j}$. The section of the trenches along axis $\vec{i}$ is greater on the surface opposite surface 22 to allow front part 110 to be clamped against base 100 by pressing screw heads on the walls of the trenches when the said screws are screwed into threaded holes 106. The trenches allow a sliding motion, along axis $\vec{k}$, of base 100 relative to front part 110, before clamping, in order to modify the distance separating bottom surface 16 and second surface 42, according to the thickness of the microfluidic card. Base 100 and front part 110 are assembled according to FIG. 10 to obtain an interconnection device according to the invention. In other words, the device thus includes adjustment means 112 enabling the distance between first surface 14 and second surface 42 to be modified, depending on the thickness of card 300 to be connected. In this example, the adjustment means take the form of bored trenches 112 made in front part 110, cooperating with threaded holes 106 made in base 100, enabling base 100 to be assembled with front part 110 by adjusting the distance between second surface 42 and first surface 14.

It may be chosen to use other means of adjusting the distance between second surface 42 and first surface 14. Thus, when base 100 and front part 110 are assembled, or form only a single part 10, a spring, positioned in the base (100, 10), may impart action to first surface 14, so as to adjust the distance between this surface and second surface 42.

Front part 110 is traversed by channels 125 emerging in second surface 42.

In this embodiment, as in the others described in this application, second surface 42 may include, in addition to the openings of fluid channels, electrical and/or optical and/or thermal means, which can be put in contact with comparable means positioned on microfluidic card 300 when the latter is connected to the device, whatever the embodiment in question. The term "optical means" is understood to mean, for example, an optical fibre, and/or an optical window, and/or an optical sensor and/or a light source. The term "thermal means" is understood to mean, for example, a thermal contact. The term "electrical means" is understood to mean, for example, an electrical contact.

For example, one or more apertures 126 may be made in part or parts 20 and/or 40, to let at least one element such as a cable or a pipe pass through, in order to put it/them in contact with one of the surfaces of microfluidic card 300. For example, aperture 126 made in walls 20 and 40 may let one or more electrical cables and/or one or more optical fibres pass through, for one or more contact measuring devices such as a surface probe. One or more apertures 126 may also be made in the embodiments described above.

In the previous embodiments, angle α (see FIG. 3) formed by first surface 14 and inclined surface 18 is equal to 270°, which defines a ridge 19 forming an axis of rotation for the card. But, more generally, angle α formed by first surface 14 and inclined surface 18 may be greater than 180°, between 180° and 270°, for example equal to 225°. The inclination of inclined surface 18 may allow easier installation of the card in insertion area 50, and easy removal of this same card from this area 50, where this inclined surface 18 then acts as a guide or support for card 300 during the steps to connect it to the device, or to disconnect it from the device. First surface 14 and bottom surface 22 may be connected directly by an inclined surface 18 or through several inclined surfaces 18.

Variants of the previous devices may include one or more holding means 60 positioned on or in one or more walls perpendicular to first surface 14 of the device, and facing a surface of microfluidic card 300.

As a variant of the embodiments presented above, holding means 60 may include a magnet able to produce a remote force, of the electromagnetic type, or means of the elastic type for application of a contact force on to one of the sides of card 300. These means of the elastic type are, for example, an elastomer material, attached to or in the surface of a wall. The microfluidic card may thus be held pressed against first surface 14 by one or more holding means 60 positioned on one of the walls of the device, and in particular on or close to rear wall 30. The card may be held in plane [O; $\vec{i}$; $\vec{j}$] by one or more holding means 60 positioned on at least one of the previous walls.

According to another variant of the previous devices, one or more seals, making channels 44 watertight or airtight between each other, present on second surface 42, and channels 302, present on connection side 306 of microfluidic card 300, may be positioned on this side 306.

Whatever the embodiment, a device according to the invention may include thermal regulation means, enabling the microfluidic card pressed against first surface 14 of the device to be heated or cooled. The temperature at the surface and/or in card 300 may thus be controlled, for example by an operator or a controller. Such regulating means may be positioned close to surface 14 in base 2. These means may use the Peltier effect, and/or include one or more electrical resistors, and/or one or more infrared heat sources, or all other means enabling the temperature of card 300 to be controlled locally or globally, whether or not by contact.

In a particular embodiment, base 10, and walls 20, 30 and 40, may be totally or partially transparent, and/or include through apertures, in order to allow optical or other analyses of card 300 connected to the device, by reflection or transmission of electromagnetic radiation, the wavelengths of which are preferably in the visible or infrared spectra.

Figure 11A:
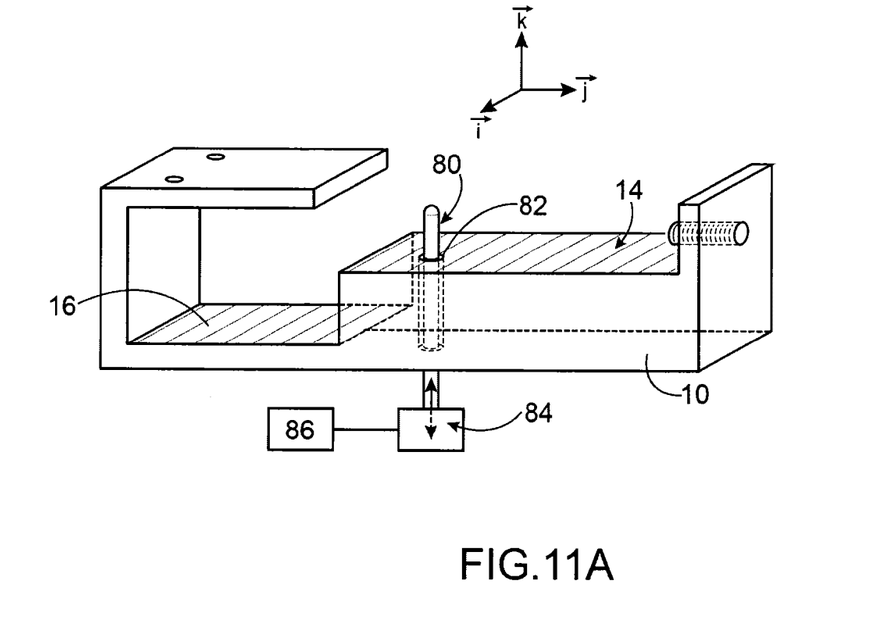
FIGS. 11A and 11B represent a variant of a three-dimensional device.
Figure 11B:
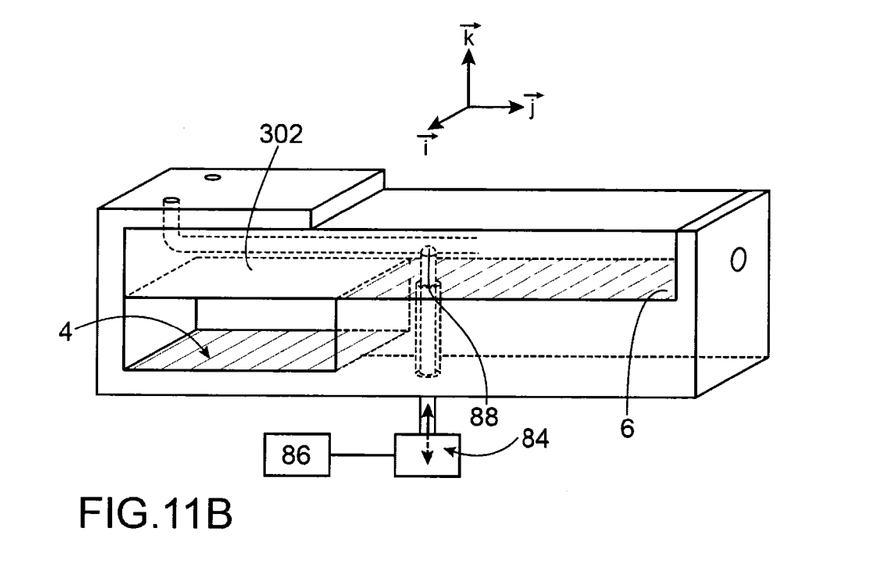

According to another embodiment, first surface 14 and/or bottom surface 16 may be traversed by one or more moving pins 80 (FIGS. 11A and 11B). Motive means 84 enable pin 80 to have a sliding motion perpendicular to first surface 14 and/or to bottom surface 16, in order to exert or release localised pressure on a flexible surface of substrate 300. The deformation of the flexible surface enables section 88 of channel 302 present in or on the surface of the card to be shrunk, or enables this channel 302 to be blocked.

The sliding motion is controlled by an operator and/or means such as a controller interacting with interface 86.

When card 300 is connected with the device according to the invention, channel or channels 44 and channel or channels 302 may convey a fluid intended for a treatment or an analysis by treatment or analysis instruments which can be connected to the device. In other words, the interconnection device according to the invention may act as an interface between fluidic card 300 and such an instrument.

A method for connecting and disconnecting a microfluidic card 300 with an interconnection device according to the invention will now be explained.

Figure 12A:
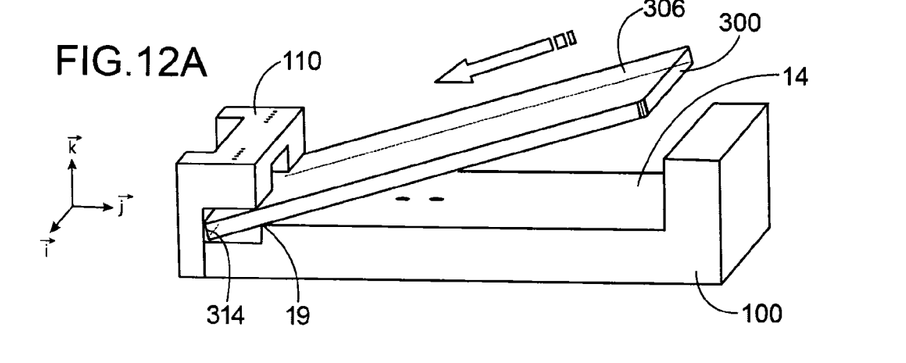
Figure 12B:
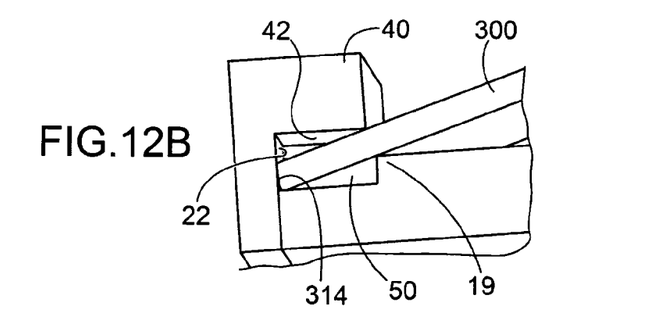

To connect the card in an interconnection device according to the invention, the operator introduces the end of card 300 into previously defined insertion area 50, as can be seen in FIGS. 12A and 12B. Card 300 is inserted into this space using a sliding motion, such that connection side 306 is facing second surface 42 of upper wall 40, and such that side surface 314 at end 312, called the front end, of the card is in contact with surface 22 of wall 20. In other words, card 300 is introduced into insertion area 50 until it comes into contact with front stop 22, and until it is pressed against ridge 19.

Figure 13A:
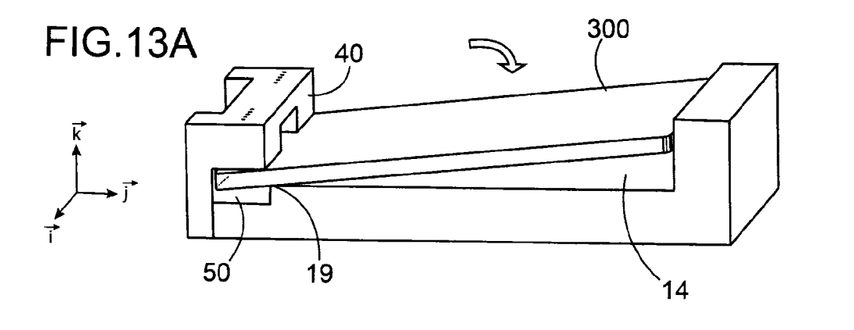
Figure 13B:
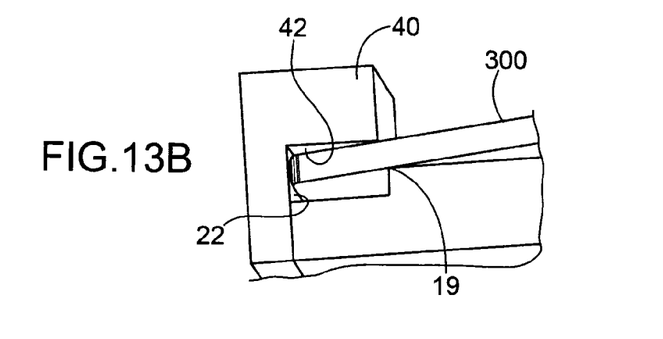

The operator accompanies the tipping motion of the card, pressing against ridge 19. A rotary motion is then exerted, enabling card 300 to pivot around axis 19 (as can be seen in FIGS. 13A and 13B) and to be pressed against first surface 14, which, by through a lever effect around axis 19, enables surface 306 of card 300 to be pressed on to second surface 42. The card is then connected to the device, and it may then be held by holding means 60 (not represented in FIGS. 12A-14B); this position is illustrated in FIGS. 14A and 14B. More specifically, when card 300 pivots around ridge 19, support side 308 of card 300 is pressed against first surface 14 of the device and, through a lever effect, connection side 306 of card 300 comes closer and may possibly be pressed against second surface 42 of the device (FIGS. 12B and 13B). Holding means 60 are deformed and/or are moved so as to enable the surface 308 of microfluidic card to be maintained in contact with first surface 14. At least one opening 304 of fluid channel 302 of card 300 is then aligned with at least one opening 45 of a channel 44, present on second surface 42 of upper wall 40. The tipping motion leads to a position in which there is watertightness or airtightness between, possibly, tubes 70 and/or channels 44 and openings 304. If seals are present, positioned to extend channels on connection surface 306 and/or on surface 42, compression of them also causes this watertightness or airtightness. In addition, the seals are in this manner preserved optimally since any shearing motion (in a plane parallel to $[O; \vec{i}; \vec{j}]$) of these seals is prevented.

The consumable or the microfluidic card may be removed simply by the operator by accomplishing the previous actions in reverse order.

In other words, the operator raises the portion of card 300 opposite front end 312 so as to remove the latter from surface 42 by a rotary motion around axis 19. The rotary motion is made until card 300 is aligned with an angle of inclination enabling it to be removed from the interconnection device by a simple sliding motion along the axis of the length of card 300, or by a sideways motion along axis $\vec{i}$.

In this description, first surface 14 and second surface 42 of the device were positioned as represented in FIG. 2. The invention covers a device of comparable geometry, according to which fluid channel 44 emerges from surface 14, which would then be called the second surface, and where surface 42 would then function as the first surface (in other words, the roles of the first and second surfaces are reversed). In such a configuration, support side 308 of the card would be held pressing on to surface 42, in order that connection side 306 is pressed against first surface 14.

A device according to the invention allows rapid, reliable and repetitive connection and disconnection of a card 300. The steps of connection and disconnection of the card can be implemented without tools and without any particular technical knowledge. A connection device according to the invention offers new advantages, such as for example:

simple and rapid manufacture,
simple and rapid use,
use in varied environments,
simple and economical maintenance.

The invention claimed is:

1. An interconnection device for interconnecting a fluidic card, wherein the card includes at least one first fluid channel, emerging from a connection side, wherein the connection side of the card is parallel to a support side, the interconnection device comprising:
   a first surface configured to receive the support side of the card;
   a ridge adjacent the first surface against which the card is positioned and forming an axis of rotation;
   a second surface parallel to the first surface, from which a second fluid channel emerges;
   a mechanism configured to hold the connection side of the card in place pressed against the second surface of the device, such that the first fluid channel is in fluid connection with the second fluid channel; and
   said axis of rotation extending parallel to the first surface and the second surface, around which the card is configured to rotate until the support side is pressed in a first direction against the first surface of the device and simultaneously the connection side is pressed in a second direction opposite the first direction against the second surface of the device in order to provide said fluid connection with the second fluid channel.

2. An interconnection device according to claim 1, wherein the the axis of rotation pivots such that the support side is pressed against the first surface, said axis of rotation being parallel to the second surface and to the first surface of the device.

3. An interconnection device according to claim 1, wherein the axis of rotation extends parallel to the ridge of the first surface.

4. An interconnection device according to claim 1, wherein said mechanism exerts on the card, positioned on the first surface, at least one force having a component perpendicular to the first surface.

5. An interconnection device according to claim 4, wherein said mechanism exerts on the card, positioned on the first surface, at least one force having a component parallel to the first surface.

6. An interconnection device according to claim 1, wherein said mechanism is detachable, to allow the card to be connected to, or disconnected from, the device.

7. An interconnection device according to claim 1, wherein at least one tube is positioned in at least one fluid channel of the device.

8. An interconnection device according to claim 1, wherein at least one seal is positioned in an opening of at least one fluid channel to allow at least one fluid to flow, without losing material, between a first fluid channel of the card and the fluid channel of the device.

9. An interconnection device according to claim 1, further comprising at least two portions which have relative positions which are variable or subject to disassembly.

10. An interconnection device according to claim 1, wherein the relative position of the first surface and of the second surface are variable.

11. An interconnection device according to claim 1, wherein the second surface does not overhang the first surface.

12. An interconnection device according to claim 1, further comprising a bottom surface adjacent to and at a different level from the first surface, parallel to the first surface, and overhung by the second surface.

13. An interconnection device according to claim 12, further comprising a front wall and a rear wall attached to the device and separated by a distance D accommodating the card according to a lengthways extension along a longitudinal axis of said device, wherein the bottom surface has, in the same longitudinal axis, a lengthways extension d of between D/2 and D/20.

14. An interconnection device according to claim 1, wherein closest ends of the first surface and of the second surface are separated by a distance equal to or greater than 1.1 or 1.2 times a thickness of the card.

15. An interconnection device according to claim 1, further comprising at least one of an electrical connector between the card and the device, an optical connector between the card and the device, and a thermal regulation device of the card.

16. An interconnection device according to claim 1, comprising at least one of:
   a surface that is totally or partially transparent to an electromagnetic radiation, and
   one wall that is totally or partially transparent to the electromagnetic radiation.

17. An interconnection device according to claim 1, further comprising at least one pin, which can move in a direction roughly perpendicular to the first surface, and which can exert a pressure on the support side of the card connected to the device.

18. A method for connecting a card including at least one first fluid channel and a connection side parallel to a support side, wherein the fluid channel includes at least one opening on the connection side of the card, and wherein the method uses an interconnection device having a first surface configured to receive the support side of the card and having a ridge adjacent the first surface against which the card is positioned and forming an axis of rotation, a second surface connected to and parallel to the first surface, from which a second fluid channel emerges, a mechanism configured to hold the connection side of the card in place pressed against the second surface of the device such that the first fluid channel is in fluid connection with the second fluid channel, and said axis of rotation extending parallel to the first surface and the second surface, around which the card is configured to rotate until the support side is pressed in a first direction against the first surface of the device and simultaneously the connection side is pressed in a second direction opposite the first direction against the second surface of the device in order to provide said fluid connection with the second fluid channel,
   the method comprising:
   inserting the card in the interconnection device and rotating the card along the axis of rotation such that the support side is brought towards the first surface and that simultaneously said connection side is pressing against the second surface; and thereafter
   holding the card in the interconnection device.

19. A method according to claim 18, wherein:
   the card is inserted in the device, such that the connection side of the card is facing the second surface, and the support side of the card is in contact with the axis and facing at least the first surface of the device;
   the card is then pivoted around the axis, until the connection side of the card is pressed against the second surface and the support side is in contact with the first surface.

20. A method according to claim 19, wherein the axis of rotation is along a ridge of the first surface, or is positioned along the first surface.

21. A method for disconnecting the card with a device, wherein the method of claim 18 is accomplished in reverse order.

22. A method according to claim 18, further comprising deformation of said mechanism to allow connection, or alternatively disconnection, of the card.

23. An interconnection device according to claim 1, wherein the second surface is connected to the first surface.

* * * * *